US012664201B2

(12) United States Patent
Morales et al.

(10) Patent No.: US 12,664,201 B2
(45) Date of Patent: Jun. 23, 2026

(54) SYSTEMS AND METHODS FOR DYNAMICALLY GENERATING GROUPS OF RECEIVED TEXTUAL DATA FOR COLLECTIVE LABELING

(71) Applicant: Capital One Services, LLC, McLean, VA (US)

(72) Inventors: Tania Cruz Morales, Washington, DC (US); Shannon Yogerst, New York, NY (US)

(73) Assignee: Capital One Services, LLC, McLean, VA (US)

( * ) Notice: Subject to any disclaimer, the term of this patent is extended or adjusted under 35 U.S.C. 154(b) by 451 days.

(21) Appl. No.: 18/067,331

(22) Filed: Dec. 16, 2022

(65) Prior Publication Data

US 2024/0202228 A1    Jun. 20, 2024

(51) Int. Cl.
| | |
|---|---|
| *G06F 40/253* | (2020.01) |
| *G06F 16/355* | (2025.01) |
| *G06F 16/38* | (2019.01) |
| *G06F 40/20* | (2020.01) |
| *G06F 40/30* | (2020.01) |

(52) U.S. Cl.
CPC ............ *G06F 16/355* (2019.01); *G06F 16/38* (2019.01); *G06F 40/20* (2020.01); *G06F 40/30* (2020.01)

(58) Field of Classification Search
None
See application file for complete search history.

(56) References Cited

U.S. PATENT DOCUMENTS

| | | | | |
|---|---|---|---|---|
| 6,192,337 B1* | 2/2001 | Ittycheriah | ............ | G10L 15/063 |
| | | | | 704/239 |
| 8,700,396 B1* | 4/2014 | Mengibar | ............. | G10L 15/063 |
| | | | | 704/235 |
| 11,688,404 B2* | 6/2023 | Wang | ...................... | G10L 15/04 |
| | | | | 704/232 |
| 11,721,326 B2* | 8/2023 | Oktem | .................... | G06F 3/167 |
| | | | | 704/246 |
| 11,727,213 B2* | 8/2023 | Swvigaradoss | ....... | G06F 40/289 |
| | | | | 704/9 |
| 11,748,613 B2* | 9/2023 | Li | ......................... | G06N 3/0464 |
| | | | | 704/9 |
| 11,763,811 B2* | 9/2023 | Ogawa | ................... | G06Q 10/00 |
| | | | | 704/235 |
| 11,790,177 B1* | 10/2023 | Barrasso | ............. | H04M 3/2281 |
| | | | | 704/9 |

(Continued)

*Primary Examiner* — Seong-Ah A Shin
(74) *Attorney, Agent, or Firm* — Foley & Lardner LLP

(57) ABSTRACT

System and methods disclosed herein are for generating labels for dynamically received textual data based on similarity with previously-labeled datasets. The system may receive first textual data. The system may determine a first timestamp at which the first textual data was received. The system may determine a first receipt range for the first textual data based on the first timestamp. The system may retrieve a plurality of datasets. The system may select a first dataset from the plurality of datasets. The system may retrieve second textual data from the first dataset. The system may determine a first similarity metric between the first textual data and the first dataset. The system may compare the first similarity metric to a threshold similarity metric. The system may determine to assign a label for the second textual data to the first textual data.

17 Claims, 4 Drawing Sheets

(56) References Cited

U.S. PATENT DOCUMENTS

| | | | | |
|---|---|---|---|---|
| 2009/0063145 A1* | 3/2009 | Hakkani-Tur | ...... | G10L 15/1822 |
| | | | | 704/E15.001 |
| 2013/0121580 A1* | 5/2013 | Chen | .................... | G06Q 10/063 |
| | | | | 704/235 |
| 2013/0173257 A1* | 7/2013 | Rose | .................... | G06F 40/284 |
| | | | | 704/9 |
| 2015/0088492 A1* | 3/2015 | Liu | .................... | G06F 16/9537 |
| | | | | 704/9 |
| 2016/0012020 A1* | 1/2016 | George | .................. | G06F 40/30 |
| | | | | 704/9 |
| 2019/0147862 A1* | 5/2019 | Lu | ....................... | G06F 16/9032 |
| | | | | 704/251 |
| 2021/0343406 A1* | 11/2021 | McMillan | .............. | G06N 20/00 |
| 2021/0357303 A1* | 11/2021 | Weissinger | ......... | G06F 16/9535 |
| 2023/0080553 A1* | 3/2023 | Dharmasiri | .......... | G10L 15/063 |
| | | | | 704/231 |
| 2023/0133583 A1* | 5/2023 | Bui | .................... | G06F 16/3344 |
| | | | | 704/9 |
| 2023/0195765 A1* | 6/2023 | Mustafi | ................ | G06F 40/216 |
| | | | | 704/9 |
| 2023/0260533 A1* | 8/2023 | Farrell | .................... | G10L 25/27 |
| | | | | 704/231 |
| 2023/0281389 A1* | 9/2023 | Lee | ........................ | H04L 51/02 |
| | | | | 704/9 |
| 2023/0315993 A1* | 10/2023 | Nieborowski | .......... | G06F 16/35 |
| | | | | 704/9 |
| 2023/0315998 A1* | 10/2023 | Sundaram | ............. | G06F 40/253 |
| | | | | 704/9 |
| 2024/0112014 A1* | 4/2024 | Wang | ....................... | G06N 3/08 |

* cited by examiner

<u>100</u>

| | 120 | 122 | 124 | 126 | 128 |
| --- | --- | --- | --- | --- | --- |
| | Dataset Identifier | Dataset Label | Dataset Average Timestamp | Data Identifier | Representativeness Metric |
| 112 | Dataset 1 | "Error Type" | 08/23/19 | 123.txt | 0.5 |
| | | | | 124.txt | 0.8 |
| | | | | 135.txt | 0.4 |
| | | | | 315.txt | 0.1 |
| 114 | Dataset 2 | "Fix Type" | 08/12/23 | 323.txt | 0.5 |
| | | | | 234.txt | 0.5 |
| 116 | Dataset 1 | "Issue Type" | 08/23/23 | 326.txt | 0.8 |
| | | | | 215.txt | 0.3 |
| | | | | 957.txt | 0.1 |
| 118 | Dataset 1 | "Error Type" | 08/28/23 | 578.txt | 0.9 |
| | | | | 787.txt | 0.6 |
| | | | | 615.txt | 0.7 |

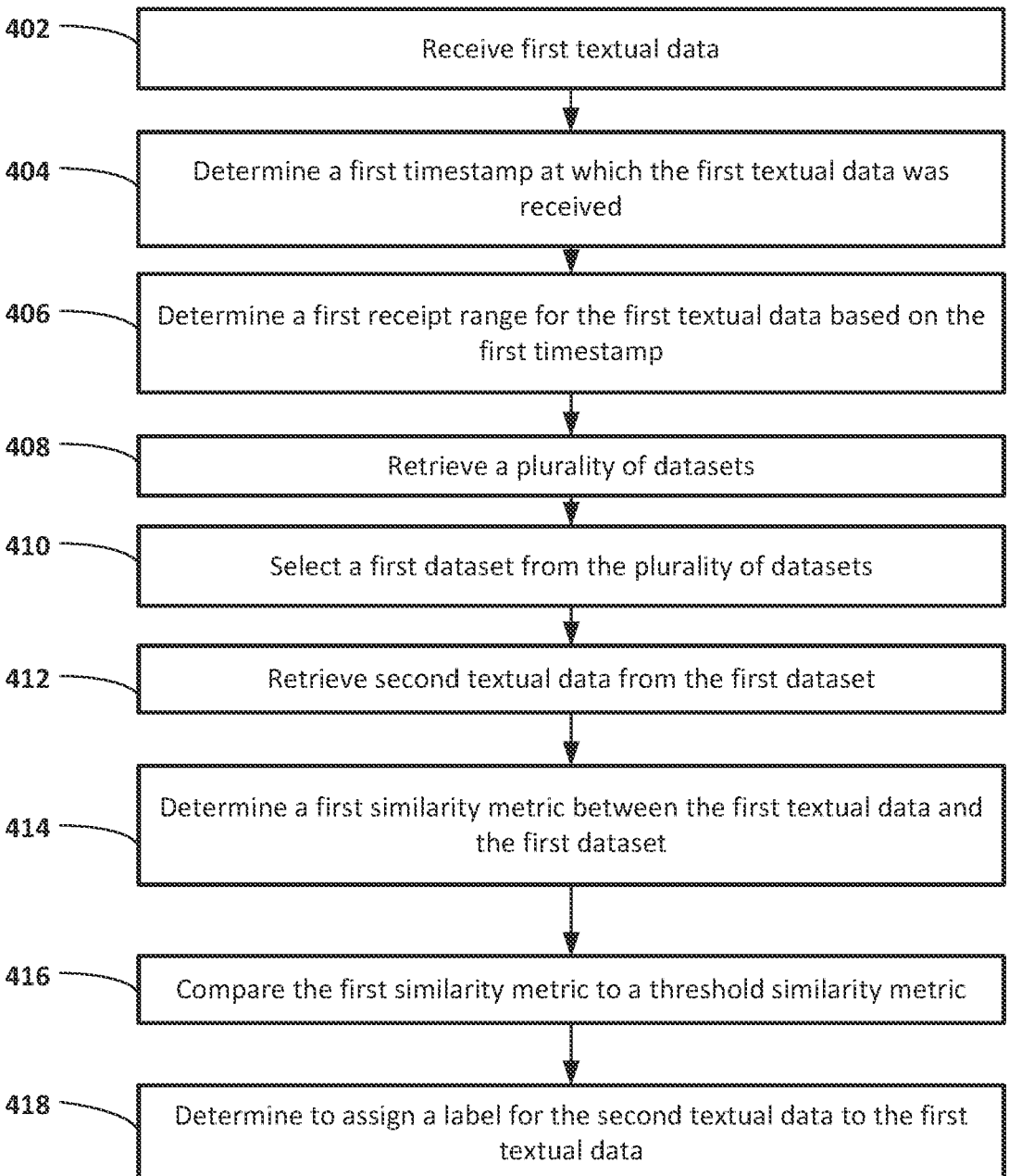

400

402 — Receive first textual data

404 — Determine a first timestamp at which the first textual data was received

406 — Determine a first receipt range for the first textual data based on the first timestamp 408 — Retrieve a plurality of datasets 410 — Select a first dataset from the plurality of datasets 412 — Retrieve second textual data from the first dataset 414 — Determine a first similarity metric between the first textual data and the first dataset 416 — Compare the first similarity metric to a threshold similarity metric 418 — Determine to assign a label for the second textual data to the first textual data

FIG. 4

SYSTEMS AND METHODS FOR DYNAMICALLY GENERATING GROUPS OF RECEIVED TEXTUAL DATA FOR COLLECTIVE LABELING

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming and a manual task. Second, despite the mainstream popularity of artificial intelligence, practical implementations of artificial intelligence may require specialized knowledge to design, program, and integrate artificial intelligence-based solutions, which can limit the amount of people and resources available to create these practical implementations. Finally, results based on artificial intelligence can be difficult to review as the process by which the results are made may be unknown or obscured. This obscurity can create hurdles for identifying errors in the results, as well as improving the models providing the results. These technical problems may present an inherent problem with attempting to use an artificial intelligence-based solution in labeling dynamically received textual data efficiently and collectively, such as for data received from chatbot interactions with users.

SUMMARY

Methods and systems are described herein for novel uses and/or improvements to labeling for machine learning and/or artificial intelligence applications. As one example, methods and systems are described herein for generating groups of received textual data dynamically such that the groups preserve semantic and syntactic information for collective labeling.

Existing systems may require manual labeling of textual data that is received for machine learning training, and, thus, may only handle static data efficiently. For example, existing systems may require human labeling of each individual datum that arrives, such as for data that is used in training machine learning models. Thus, conventional systems handle dynamically received data poorly, due to the time-consuming nature of labeling. Moreover, human labeling of each data may lead to inconsistent or inaccurate labeling (e.g., due to subjective bias between labelers, or typographical mistakes). Additionally, conventional labeling techniques may not handle dynamically received data well, as data streams may arrive too quickly to process manually. Thus, conventional labeling techniques handle static data, but may struggle to handle real time data streams, such as those arising from chatbot conversations.

Labeling may take advantage of machine learning techniques as one solution, such as artificial intelligence, to automatically handle data that is received. However, systems that perform automatic labeling conventionally label each individually received piece of data, leading to computational challenges, such as data storage or the amount of processing power that is required to handle dynamically received data at once. Additionally, artificial intelligence methods may require abundant training data in order to refine classification tasks, as artificial intelligence methods. Additionally, artificial intelligence methods may struggle to issue accurate predictions in situations where training data is obsolete or irrelevant to the task at hand, such as where data may dynamically drift. Thus, adapting artificial intelligence models to solve these issues faces several technical challenges, such as determining how to reduce the required number of labeling tasks to ensure that labeling large volumes of dynamically received data is feasible. Additionally, determining which data may be relevant to a given labeling decision may be difficult, as obsolete data is often incorporated in training data and, thus, may unfavorably bias any subsequent labeling decisions.

To overcome these technical deficiencies in adapting artificial intelligence models to solve these problems, methods and systems disclosed herein may dynamically calculate similarity metrics between text data and data within a textual database based on text similarity and time of receipt using natural language processing. The system may then determine a representative piece of data based on determining self-similarity metrics, in order to determine a label for the received textual data, thereby leveraging previously-labeled data to eliminate the need to label received data individually. For example, the system may receive data and classify the data into a group based on a similarity metric, where the similarity metric provides information on whether a group is similar to the data. Thus, the system may subsequently make labeling decisions collectively, for the whole group, without individually labeling each piece of data, enabling a reduction in the number of labeling tasks required, while only considering a limited amount of data that is relevant to the given application.

The system may also determine a timestamp for receipt of the data and determine a receipt range based on this timestamp. The system may additionally verify that the group is consistent with the receipt range (e.g., through an average timestamp of the group) and, based on this verification, assign the label to the textual data based on similarity to the given group. Thus, the system may only collectively label data that is relevant or not obsolete, thereby improving the accuracy of these collective labeling decisions and ensuring that obsolete data is excluded from any assignment of labels or classification task. Accordingly, the system enables efficient labeling of dynamically received datasets in a way that provides fast, real time grouping of received data, so that data may be processed as it is received, and so that labeling is more sensitive to more recent data than irrelevant, obsolete data. Additionally, assignments of groups for data may improve over time as more recent data is received and labeled, thereby improving the accuracy and efficiency of the system.

In some aspects, the system may receive, from a first device in a computer network, first textual data, wherein the first textual data is based on a first text string. The system may determine a first timestamp at which the first textual data was received. The system may determine a first receipt range for the first textual data based on the first timestamp. The system may retrieve a plurality of datasets, wherein each of the plurality of datasets corresponds to a given receipt range. The system may select a first dataset from the plurality of datasets based on the first dataset corresponding to the first receipt range. The system may retrieve a second textual data from the first dataset, wherein the second textual data is based on a second text string, and wherein the second textual data has a second timestamp, and wherein the second timestamp is within the first receipt range. The system may determine a first similarity metric between the first textual data and the first dataset. The system may compare the first similarity metric to a threshold similarity metric. Based on comparing the first similarity metric to the threshold similarity metric, the system may determine to assign a label for the second textual data to the first textual data.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a." "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1 shows an illustrative diagram for a data structure demonstrating grouped datasets for streamlining labeling tasks related to dynamically received textual data, in accordance with one or more embodiments.

FIG. 4 shows a flowchart of the steps involved in generating labels for dynamically received data collectively based on similarity metrics, in accordance with one or more embodiments.

DETAILED DESCRIPTION OF THE DRAWINGS

Figure 2:
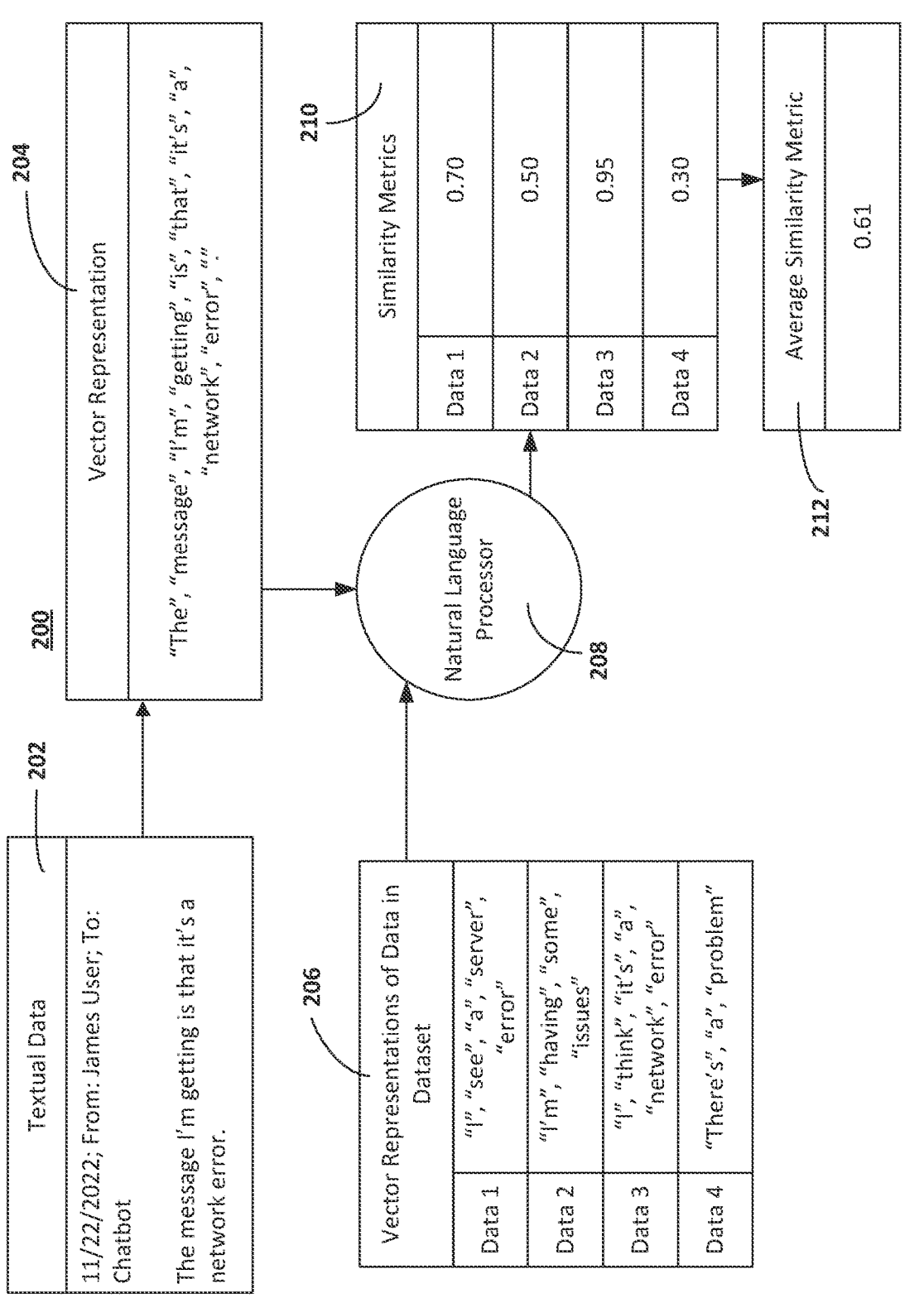
FIG. 2 shows an illustrative diagram for generating and processing vector representations of textual data for the calculation of average similarity metrics, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1 shows an illustrative diagram for a data structure demonstrating grouped datasets for streamlining labeling tasks related to dynamically received textual data, in accordance with one or more embodiments. For example, data structure 100 may include information regarding previously-received data, as identified with data identifiers 126 (e.g., identified through a filename or another unique identifier). For example, data structure 100 may include information related to datasets (e.g., datasets 112-118) that may each include data that is similar to each other (e.g., identified by dataset identifiers 120). The corresponding dataset may be labeled with dataset labels 122, which may reflect the nature of the data within the dataset. In some embodiments, the system may calculate representativeness metrics 128 corresponding to each piece of data within a dataset, which may indicate the extent to which a given piece of data represents other data within the same dataset.

For example, FIG. 1 illustrates data that may be grouped according to similarity with other data and labeled accordingly. By grouping received data as such, the system may simplify labeling tasks. For instance, the system may label an entire dataset, such as dataset 1 (e.g., dataset 112 in FIG. 1), based on a single piece of data that is representative of the dataset. For example, the system may calculate representativeness metrics 128 and, accordingly, determine textual data identified as "124.txt" best represents dataset 1. Based on this determination, the system may determine a dataset label (e.g., "Error Type") solely based on labeling this representative piece of textual data. By doing so, the system may label many pieces of data with only a single labeling decision (e.g., data identified as "123.txt." "135.txt," and "315.txt"), thereby improving the efficiency of labeling tasks when compared to conventional systems, which rely on independently labeling each piece of received data. By determining this label based on calculating a representativeness metric, the system may improve the accuracy of any such labeling decisions, by ensuring that only data that is most representative of the dataset may be considered in the labeling process. Thus, the system may improve handling of dynamically received data, which may be large and unwieldy to handle manually and/or individually, by reducing the number of labeling tasks required.

For example, the system may be used to label datasets arising from virtual assistants, such as chatbots. In disclosed embodiments, a virtual assistant may include a software agent that may perform tasks or services for users based on commands or questions. In some embodiments, the virtual assistant may include a chatbot with a textual interface (e.g., through instant messaging). In some embodiments, a virtual assistant may include smart-speakers or mobile operating systems that receive queries through sound, such as through microphones, and may process this information using speech recognition technology. In some embodiments, a virtual assistant may include wearable technology with capabilities to perform tasks or service in response to commands, such as smart-watches or smart-rings, where commands or queries may be received and answered in a portable, wireless manner. As virtual assistant data may be diverse in format and length, and may be transmitted or received in various manners, it may be especially challenging to classify virtual assistant data into labels for further processing through machine learning models. Thus, a system that provides contextual labeling information and may compare datasets based on qualitative or quantitative similarity may ensure that virtual assistant data may be classified efficiently and accurately.

For example, the system may be used to label datasets arising from chatbots, such as pieces of chatbot conversations. In disclosed embodiments, a chatbot may include a software application used to conduct online chat conversation via text, rather than through contact with a live human agent. In some embodiments, chatbots may be designed to simulate the way a human may behave conversationally. For example, chatbots may be accessible through websites, through application programming interfaces or through applications. Chatbots may receive instructions or commands through a text input interface (e.g., through an interface with a physical or virtual keyboard), or may receive instructions or commands through speech and a speech recognition program. Chatbots may output information or answers to queries as text or through speech (e.g., through a text-to-speech system). As data received from chatbots (e.g., a chatbot's output text data) may be created dynamically through the course of a conversation with a user, labeling chatbot data manually or individually may be difficult, as data may arrive at once and/or unpredictably. The system disclosed herein may document labels for text data that is dynamically received, in a way that improves the efficiency of labeling large amounts of received chatbot data, as data may be grouped together rather than individually labeled. Thus, the system ensures that chatbot data may be handled efficiently, with less required processing power, system memory, and time.

The system may be used to label and categorize data arising from chatbot users. In disclosed embodiments, a chatbot user may include any user of a chatbot or an equivalent virtual assistant. For example, in some embodiments, a chatbot user may include a user of an application requesting support, such as technical support or account support. A chatbot user may include a user of an application requesting information, such as weather or traffic information for a given location. In some embodiments, a chatbot user may interface with the chatbot through a mobile device, such as a laptop computer, a smartphone, or a tablet. In some embodiments, a chatbot user may interface with the chatbot through a desktop computer, keyboard, or a microphone, through speech-to-text recognition. The chatbot user may utilize words, phrases, sentences, or numbers, and may provide information, ask questions, or issue commands to the chatbot. Chatbot users may communicate with the chatbot in unpredictable ways, starting and stopping interactions sporadically. Additionally, chatbot users may be more likely to be awake or active at certain peak times of the day, which may overwhelm conventional systems that seek to label such data. The presently disclosed system may determine labels for received chatbot data that may be too large in volume to process independently by grouping such data by similarity. Thus, the system decreases the processing power and time required to label dynamically received chatbot data as fewer labeling tasks are required and, accordingly, enables better handling of such dynamically received data, even if unpredictably produced and large in volume.

The system may receive a request to label chatbot data from speech recognition models. In disclosed embodiments, a speech recognition model may include methodologies or technologies that enable recognition and translation of spoken language into text. In some embodiments, speech recognition models may require training, where a user may read text or isolated vocabulary in order to train the system. The system may analyze the user's voice and fine-tune recognition capabilities based on the user's voice sample. In some embodiments, speech recognition may utilize hidden Markov models, dynamic time warping, neural networks, or end-to-end automatic speech recognition. In some embodiments, speech recognition may be used to convert a user's speech to a textual dataset that may be stored or input into an application or a machine learning model. For example, speech recognition may enable a user's request for weather information (e.g., a user's question, "What will the weather be like tomorrow?") to be translated to text, such that it may be stored and/or processed by a chatbot for further processing. A speech recognition model may enable the system to process more types of data, and may enable the system to determine textual data from speech data. The system disclosed herein may subsequently label this textual data depending on the context, nature, or words within the data. By enabling receipt of both speech and text information, speech recognition may enable more data to be processed and labeled by a chatbot, as well as beyond a chatbot for the purposes of training, evaluation, or data analysis.

The system may determine labels for dynamically received textual data while preserving semantic and syntactic information. In disclosed embodiments, semantic and syntactic information may include data relating to the meaning and/or grammar of textual data. Semantic and syntactic information may include indications of how similar the meaning of a sentence is to another sentence in terms of meaning and logic, even if all words in the sentence are different. For example, the system may determine that the sentences "The dog is walking to-and-fro" and "The hound is pacing" are similar in both semantic and logical terms. Thus, even if the letters and/or words in the sentence are substantially different, the system may preserve the semantic and syntactic meaning of the phrase and group such data accordingly. By doing so, the system may ensure the accuracy of labeling decisions of textual data on the basis of similarity, without neglecting any similarities in meaning or grammar.

FIG. 2 shows an illustrative diagram for generating and processing vector representations of textual data for the calculation of average similarity metrics, in accordance with one or more embodiments. For example, the system may utilize flow 200 for the generation of similarity metrics of unlabeled textual data. The system may receive textual data 202, which may include textual data from a chatbot interaction, for example. The system may generate vector representation 204 of this textual data, for example, through using a bag-of-words method. The system may also retrieve and/or generate vector representations 206 of data in a dataset. The system may input vector representation 204 and vector representations 206 into natural language processor 208 in order to generate similarity metrics 210 between the textual data and each piece of data within the dataset. Thus, the system may generate average similarity metric 212 to determine a measure of similarity of textual data with a previously compiled dataset.

Conventional systems may execute labeling decisions with manual labelers, with little to no knowledge of previous datasets that may have already been labeled. Thus, conventional labeling tasks may produce errors, inconsistencies, or duplicated labels for the same data, potentially leading to model input errors and unsatisfactory machine learning performance. By calculating similarity metrics between unlabeled data and other datasets, the system may objectively determine previously-labeled datasets that are most similar to the unlabeled data in a way that is consistent with previous labels and in a non-subjective manner and, by doing so, may rely on groups of data that have already been labeled for labeling decisions. Accordingly, the system may improve modeling outcomes and improve the efficiency of labeling tasks prior to further data processing, as the system may not have to generate a label for each received piece of data individually. Rather, for example, the system may rely on an average similarity metric between textual data and various datasets in order to determine the dataset that includes data that is most similar to the textual data. Based on this determination, the system may label the textual data by association with this dataset, rather than individually labeling the data (e.g., manually or through a machine learning algorithm, which may be inefficient).

The system may use or handle datasets. In disclosed embodiments, a dataset may refer to a structure that includes multiple data, including textual data, training data, or output data. For example, a dataset may refer to a set of data where all data in the set are related to a type of error experienced by a user. In some embodiments, a particular label (e.g., "Error Type" as shown in FIG. 1 for dataset 112) may be associated with a given dataset (e.g., dataset 1 in FIG. 1). In some embodiments, a dataset may be textual in nature (i.e., a textual dataset), where each datum within the dataset may include textual data. For example, a textual dataset labeled as "Error Type" may include textual data of alphanumeric strings (e.g., a text string) that include sentences related to users complaining about errors and specifying the type of error. In some embodiments, textual datasets may be generated from audio or speech data through speech recognition software. Datasets may be associated with inputs or outputs for machine learning models. For example, a machine learning model may accept as input a dataset (e.g., a textual dataset), and may, in response to the input, generate an output dataset that includes a plurality of output data. By creating datasets by grouping similar textual data together, the system may streamline labeling decisions by only considering representative pieces of data from the given dataset. By doing so, the system may handle dynamically received data more efficiently and automatically, without relying on manual or individual labeling of each received piece of data.

The system may utilize timestamps. In disclosed embodiments, a timestamp may include an indicator of a time corresponding to the receipt, modification, or generation of a dataset, piece of data, machine learning model, or label thereof. For example, a timestamp may include a date and time for the receipt of textual data from a chatbot conversation. In some embodiments, a timestamp may include a time when a given labeled dataset was input into a machine learning model, such as for training. Alternatively, or additionally, a timestamp may be determined through a temporal identifier, such as a system clock setting, that is standardized across the computer network. By determining a timestamp, the system may ensure that any labeling decisions for data take into account the currency or relevance of datasets, such that the system may take advantage of contextual information to inform further labeling decisions. For example, if two datasets are both substantially similar to a given piece of textual data, the system may determine an average receipt time for data within a dataset (e.g., an average timestamp corresponding to each dataset) in order to determine which dataset may be more relevant to a given piece of received data. Thus, the system may preferentially treat a dataset with more recent data and apply a similar label to recently received textual data. By doing so, the system may make more accurate, relevant labeling decisions that may be consistent with received data at the time of the decision, avoiding obsolescence or incompatibility in any labeling decisions.

The system may determine receipt ranges based on timestamps. In disclosed embodiments, a receipt range may include an indication or a condition that data or a dataset may satisfy in order to be relevant to a labeling decision. For example, a receipt range may include a range of values of time, such as a start time and/or date and an end time and/or date. In some embodiments, a receipt range may specify only a start time, so that the system may only consider data that is more recent than the start time. By determining a receipt range and conducting labeling decisions based on this determination, the system may ensure that only datasets that are relevant or not obsolete may be compared with the received textual data, thereby reducing the chance of inaccurate labeling decisions that are irrelevant or obsolete.

The system may determine receipt ranges using a relevance window. In disclosed embodiments, a relevance window may include an indication of a length of time for which data within a dataset may be considered relevant, for example, to a labeling decision of dynamically received data. For example, a relevance window may specify "7 days" if incoming data is only to be compared with data that was generated within 7 days of receipt of the incoming data. In some embodiments, the relevance window may depend on the application or textual data received. For example, textual data arising from a chatbot that provides technical support may be relevant even for longer periods of time and, thus, exhibit a relevance window of months or years, as technical updates may be rolled out only on that timescale. On the other hand, a chatbot that discusses current events, such as election results or news stories, may have a shorter relevance window, such that data may be labeled on the basis of only the most recent data. In disclosed embodiments, a relevance timestamp may include the start date or start time of the receipt range, after which information (e.g., previously-received textual data) will be considered. Thus, receiving or determining a relevance window enables the system to tailor the labeling process depending on the application, thereby enabling more accurate labeling decisions.

The system may include similarity metrics. In disclosed embodiments, a similarity metric may include any measure of similarity between data, datasets, and/or labels. For example, a similarity metric may be related to an inverse of a distance metric, and may represent any function of datasets or data that exhibit large values for similar objects and low values for dissimilar objects. In some embodiments, a similarity metric may correspond to a cosine similarity between two text strings (e.g., for textual data). For example, as shown in FIG. 2, in some embodiments, the system may determine similarity metrics of a textual data (e.g., textual data 202) with respect to data within a dataset (e.g., as represented by vector representations 206 of data in a dataset). For example, the system may vectorize the textual data to form vector representation 204, and pass both the vector representation of the datum and the vector representations of data in a dataset into natural language processor 208 in order to determine similarity metrics 210. The system may generate an average of these similarity metrics (e.g., average similarity metric 212) in order to characterize the similarity of the textual data to the given dataset as a whole. For example, the natural language processor may determine text distances between textual data and each piece of data within the dataset (e.g., cosine distances in a vector space model) and generate an average similarity metric between the textual data and the entirety of the dataset, based on these text distances. By doing so, the system may objectively determine similarity between textual data, while leveraging lexical and syntactical information within the analysis through the natural language processor.

In some embodiments, the natural language processor may generate these similarity metrics without recourse to text distances, simplifying the calculation. Additionally, or alternatively, the system may generate similarity metrics without a natural language processor by comparing vector representations of the textual data and the respective data within the dataset. For example, the system may calculate bag-of-words vector representations of the textual data and each datum within the dataset and compare these (e.g., by calculating a normalized inner product between the vector representations). Generating similarity metrics between textual data without use of a natural language processor may enable faster, more efficient calculations, as less computational power may be required for vector manipulation and analysis when compared to natural language processing or other machine learning techniques. By generating similarity metrics, the system may objectively determine whether datasets or labels are related to each other, and, as such, the system may make improved recommendations for labels for both pre-existing datasets and new data received. In some embodiments, the system may compare a similarity metric with a threshold similarity metric in order to determine whether textual data is similar enough to the data within a dataset, to apply the dataset's label to the received textual data. By leveraging an objective metric, such as similarity metrics, the system may reduce the effect of human bias, error, or inconsistencies in labeling tasks, leading to improved machine learning outcomes. Additionally, the system may leverage information regarding similarity between textual data and previously-labeled data in a dataset in order to simplify labeling decisions, enabling labeling of data in bulk, as it is received, on the basis of similarity, rather than individually or manually.

The system may determine representativeness metrics corresponding to data within a dataset. In disclosed embodiments, a representativeness metric indicates an extent to which textual data within a dataset represents other data within a dataset. For example, a representativeness metric may include an average similarity metric of a dataset with all other data within the same dataset. By calculating an average similarity metric of data within a dataset, the system may determine which data with which to carry out a labeling decision. The outcome of a labeling decision may depend on the data on which the labeling decision is made. Thus, the system may determine a label based on determining data that is most representative of a given dataset, and base any label on this data. By doing so, the system ensures that the dataset may be labeled with the data that best represents the dataset as a whole, thereby improving the accuracy of labeling decisions and enabling batch-labeling of dynamically received data (e.g., by applying the label corresponding to the most representative data in a dataset to the dynamically received data).

The system may utilize labels. In disclosed embodiments, a label may refer to a name, tag, or marker of a datum or dataset for use in a machine learning model. For example, a label may classify or describe a text string describing a set of data. For example, data arising from wind observations for weather predictions may be associated with a label such as "wind observations." In some embodiments, a piece of data may be associated with a dataset, which in turn is associated with a particular label. Labels enable data to be associated with meaningful, associated labels that provide context such that machine learning models may learn from the data. For example, labels may indicate whether a dataset includes words (e.g., textual data), and may indicate a classification or a category for the given dataset. Labels may also enable mapping of data to the various features or independent variables for the machine learning model. Labels aid in training machine learning models, as they provide structure to unlabeled data and, therefore, transform data into a form that may be used for training machine learning models further. By labeling dynamically received data on the basis of similarity with other datasets, the system may more efficiently apply labels to received data, as the number of labeling tasks (e.g., manual or automatically using artificial intelligence) may be reduced.

The system may use vector representations of data. In disclosed embodiments, a vector representation may include a representation of data in vector space. For example, vector representations may include word embedding of textual data into vectors. In some embodiments, the system may generate vector representations of textual data such that syntactical, morphological, and lexical information of the textual data is preserved within the vector representations. For example, the system may use a bag-of-words model, where words are represented as vectors based on the number of occurrences of a given word within textual data. In some embodiments, the system may vectorize the words using a term frequency-inverse document frequency (TF-IDF) model to reflect the importance of words in textual data based on a collection or corpus of text data. In some embodiments, semantic and lexical information may be reflected within a vector representation using a word2vec algorithm, where semantic similarity may be represented through a cosine similarity between vectors (e.g., related to an inner product between vectors). In some embodiments, the system may utilize natural language processing models to generate vector representations of data. By generating vector representations of data, textual data may be stored in the system more uniformly, enabling direct comparisons between textual datasets, for example. Vector representations may improve the efficiency of further processing data through machine learning models, as numerical vectors and arrays may be more readily processed. Thus, vector representations of text data may improve the efficiency and portability of labeling decisions, by providing a uniform way of comparing and processing training data.

The system may calculate or use text distances. In disclosed embodiments, a text distance may include a metric that describes dissimilarity between two texts, such as text data or datasets. A text distance may include a measure of how many edits are required to transform one text string to another text string, such as a Levenshtein Edit Distance or a Hamming Distance. In some embodiments, the system may compute cosine similarity between two texts, formed by vectorizing the text data (e.g., generating vector representations, as described above) and calculating a cosine distance between the vectors in the n-dimensional vector space representing the texts. By calculating a cosine distance, the system may compare text data that may be of different vector lengths, enabling a normalized representation of similarity between two vectors. In some embodiments, the system may calculate Euclidean distances between vector representations of text data for text distance. In this case, Euclidean distances may provide information about textual data length, as well as other syntactic information, as opposed to cosine similarity. By calculating text distances and basing labeling decisions on these distances, the system may leverage uniform, mathematical, objective measures for measuring data similarity, leading to improved consistency and reduced bias in labeling decisions.

The system may utilize natural language processing models (such as natural language processor 208). In disclosed embodiments, a natural language processing model may refer to a model, algorithm, or process to analyze natural language data, such as language arising from humans. In some embodiments, natural language processing models may be symbolically coded or manually coded, such as through the generation of rulesets for analyzing language. Natural language processing models may utilize machine learning models or algorithms, in some embodiments. For example, a natural language processing model may be capable of generating vectorized representations of textual data, such as through a bag-of-words algorithm or a word2Vec algorithm. A word2Vec algorithm may capture semantic and syntactic qualities of words in such a way that distances between vectors may indicate levels of semantic dissimilarity between the words represented by those vectors, for example. In some embodiments, a natural language processing model may accept vector representations of textual data as input, and may categorize data into labels, for example, or generate similarity metrics between the vector representations. Examples of natural language processing models may include optical character recognition, where input data may be in the form of unprocessed text. In some embodiments, natural language processing models may include speech recognition, such that the system may receive data as audio files and may transcribe the speech-to-text using speech recognition. In some embodiments, the natural language processing model may interface with another machine learning model in order to both process incoming data and determine, based on the label record database, labels for the given data. For example, the system may utilize a sentiment analysis model to label respective data into sentiments. In some embodiments, the natural language processing model may enable the system to maintain syntactic, lexical, and morphological information and consider this information throughout the analysis. By utilizing natural language processing models for label creation and model analysis, the system enables objective analysis of incoming text data without the need for human intervention; as such, the system enables improved consistency and mitigates the risk of human error.

The system may utilize a sentiment analysis algorithm. In disclosed embodiments, a sentiment analysis algorithm may include a model, process, or algorithm that enables categorization of the sentiment of text. For example, sentiment analysis algorithms may utilize natural language processing techniques, including artificial intelligence and machine learning, in order to detect whether textual data is positive or negative (e.g., through graded sentiment analysis), or detect an emotion within textual data. Sentiment analysis algorithms may be useful in analyzing user feedback (e.g., feedback from a chatbot that handles technical issues). Sentiments, for example, may include an indication of the subjective positivity or negativity of textual data, or the identification of a prevailing emotion underlying textual data. For example, a sentiment analysis algorithm may provide real time analysis of chatbot conversations, enabling handling and categorization of data that is dynamically received. In some embodiments, the system may determine a sentiment based on training a model from received textual data and a label generated by the system. The system may generate a prediction for a sentiment based on the sentiment analysis model, and compare this predicted sentiment with a training sentiment, such as a ground-truth sentiment (e.g., a sentiment as determined by a human labeler or by the user themselves), in order to evaluate the performance of the sentiment analysis algorithm and/or machine learning model. Thus, by generating predicted sentiments, the system may evaluate the application of any label to textual data and the effect of training the sentiment analysis model using this labeled data. Thus, the system may improve labeling for further dynamically received data.

The system may utilize, generate, or handle feature inputs. In disclosed embodiments, a feature input may include any individual measurable property or characteristic of a phenomenon. For example, a feature input may include numeric data, such as statistical data, or may include structural features, such as strings or graphs. In some embodiments, a feature input may include a dataset that includes data prepared for processing through a machine learning model. For example, a feature input may include a plurality of text strings of sentences within chatbot interactions that are related to an Error Type. In some embodiments, a feature input may be vectorized within a vector space known as a feature space. A feature input may directly refer to specific datasets (such as those listed in data structure 100 under dataset identifiers 120), and may have a respective label (such as those listed in data structure 100 under dataset labels 122). By generating and processing feature inputs through machine learning models, the system enables evaluation of datasets for the purpose of machine learning training and inputs. For example, processing feature inputs through a machine learning model enables calculation of model error indicators for a given dataset through a machine learning model, enabling more accurate and efficient labeling decisions for future labels.

The system may generate an output for the machine learning model. In disclosed embodiments, an output may include a dataset or a datum that has been produced from a machine learning model. In some embodiments, outputs may include predictions to phenomena based on feature inputs. For example, a machine learning model may receive, as input, chatbot text data from a user regarding satisfaction with the chatbot service. The system may categorize this input data as being related to user satisfaction and may further process this input data to predict a satisfaction level for the user. In some embodiments, an output may be used for training purposes. For example, an output may include a prediction (e.g., a predicted sentiment) that is compared against a training dataset (or, for example, a ground-truth sentiment) to determine an error for the prediction. Based on this error, the system may, alternatively or additionally, determine a model error indicator, which may include a statistical measure of uncertainty or error in the model. Thus, by determining outputs for machine learning models, the system may enable evaluation of model performance relating to the labeling of input datasets (e.g., the labeling of feature inputs), and, as such, may enable improved predictions and suggestions for labeling decisions.

Figure 3:
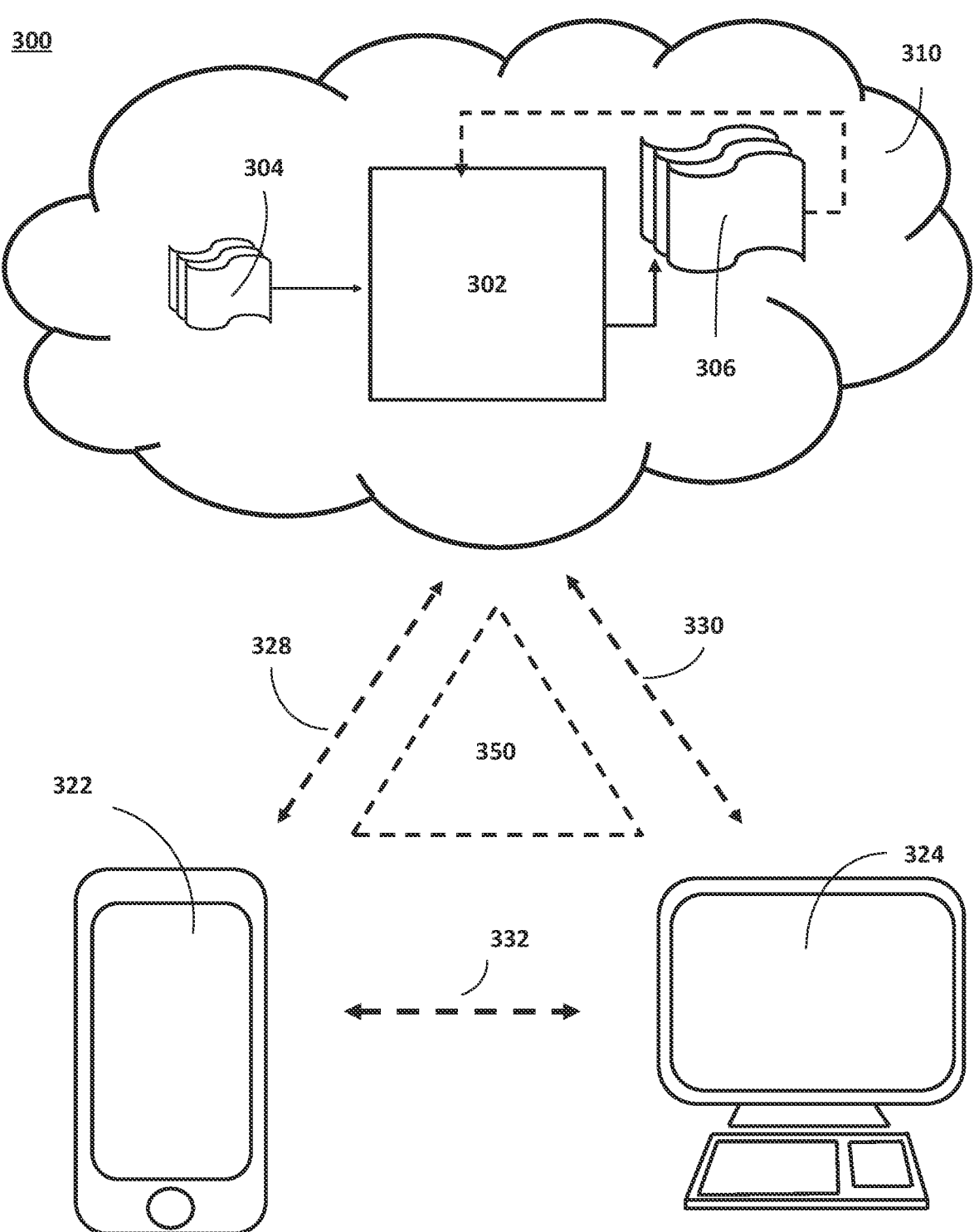
FIG. 3 shows illustrative components for a system used to generate labels for dynamically received data collectively based on similarity metrics, in accordance with one or more embodiments.

FIG. 3 shows illustrative components for a system used dynamically to generate groups of received textual data in real time such that the groups preserve lexical and syntactic information for collective labeling, in accordance with one or more embodiments. For example, FIG. 3 may show illustrative components for labeling textual data arising from chatbot conversations collectively based on similarity metrics in order to reduce the number of labeling tasks required. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE (long term evolution) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include data structures that include information regarding datasets and associated pieces of data, as shown in data structure 100 in FIG. 1. Additionally, or alternatively, cloud components 310 can include similarity metric data (e.g., similarity metrics 210 and/or average similarity metric 212) or representativeness metric data (e.g., representativeness metrics 128 in FIG. 1). In some embodiments, cloud components 310 can store vector representations of textual data and/or data from datasets, and can process data through natural language processor 208.

Cloud components 310 may access servers and/or other devices or systems connected to a computer network. For example, cloud components 310 may receive or otherwise access chatbot conversation data. In some embodiments, cloud components 310 access databases storing textual data, as well as databases storing labeling information (e.g., a label record database).

Cloud components 310 may include model 302, which may be a machine learning model, artificial intelligence model, etc. (which may be referred to collectively herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., determining a label for dynamically received textual data).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a determination of a sentiment for dynamically received chatbot conversation data).

In some embodiments, the model (e.g., model 302) may automatically perform actions based on outputs 306. In some embodiments, the model (e.g., model 302) may not perform any actions. The output of the model (e.g., model 302) may be used to label training data more accurately and efficiently and thereby improve the quality of machine learning model outputs.

System 300 also includes API layer 350. API layer 350 may allow the system to generate summaries across different devices. In some embodiments, API layer 350 may be implemented on mobile device 322 or user terminal 324. Alternatively, or additionally, API layer 350 may reside on one or more of cloud components 310. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called Web Services Description Language (WSDL), that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying web application firewall (WAF) and distributed denial of service (DDoS) protection, and API layer 350 may use RESTful APIs as standard for external integration.

FIG. 4 shows a flowchart of the steps involved in dynamically generating groups of received textual data in real time such that the groups preserve lexical and syntactic information for collective labeling, in accordance with one or more embodiments. For example, the system may use process 400 (e.g., as implemented on one or more system components described above) in order to label dynamically received chatbot conversation data arriving in bulk to determine user sentiment.

At step 402, process 400 (e.g., using one or more components described above) may receive first textual data. That is, the system may receive, from a first device in a computer network, first textual data, wherein the first textual data is based on a first text string. For example, the system may receive excerpts of chatbot conversations from a user device. Such received data may be dynamically produced and transmitted, and may be received sporadically or all at once. By receiving data in real time, the system may process data and label data that may otherwise take a long time to be labeled, as the system may handle the received data collectively rather than individually. Thus, the system may handle large volumes of dynamically received data, such as textual data generated in chatbot conversations, and process the data efficiently as it is received.

At step 404, process 400 (e.g., using one or more components described above) may determine a first timestamp at which the first textual data was received. For example, the system may retrieve, at the time of receipt of the textual data, a timestamp corresponding to the system or computer network. The timestamp may include a date, year, or other contextual information (e.g., a session identifier), such that the system may categorize the received textual data sequentially or temporally. By generating a timestamp, the system may determine information that may aid in contextualizing the relevance and history of other data and associated labels, thereby enabling further labeling decisions. For example, the system may generate criteria or requirements for data to consider in a labeling decision based on the recency of the data with respect to the received textual data.

In some embodiments, the system may determine the first timestamp through retrieval of a system clock setting at a time of receipt for the first textual data. That is, the system can retrieve a system clock setting at a time of receipt for the first textual data, wherein the system clock setting comprises a standardized setting for recording times across the computer network. The system may generate the first timestamp based on the system clock setting. For example, the computer network may be linked to a network time server, such as one managed by the National Institute of Standards and Technology (NIST), such that any devices communicating with the computer network may exhibit synchronized time settings. By determining the modification timestamp based on such a setting that is standardized for recording times, the system may ensure that there are no ambiguities in label modification timelines, enabling the system to accurately determine the most recent labeling decisions. This process may be particularly useful in multi-user labeling tasks, where multiple users may generate labels for data within a short period of time. Thus, the system may accurately characterize the received textual data using this system clock setting and record this information as a timestamp. By doing so, the system ensures non-ambiguity and consistency within any records that are generated, enabling direct comparisons to determine the recency of different data received at different times.

At step 406, process 400 (e.g., using one or more components described above) may determine a first receipt range for the first textual data based on the first timestamp. For example, the system may determine a range of times (e.g., a range of dates or years) from which previously-received data will be considered in a labeling decision of the received textual data. The system may only compare data that was received within a few years or a few weeks of receipt of the textual data, such that obsolete data is omitted from any labeling decisions. By doing so, the system may improve the accuracy of labeling decisions and ensure that labels are relevant to the given chatbot interaction, for example.

In some embodiments, the system may determine the first receipt range for the first textual data by applying a relevance window to the first timestamp. That is, based on the textual data, the system may generate a relevance window, wherein the relevance window comprises a length of time, and wherein the relevance window indicates a period of time before which information may not be considered for labeling decisions. Based on the relevance window, the system may determine a relevance timestamp after which the information will be considered. For example, the system may determine a period of time, based on the particular application or circumstances, that describes information that may be recent enough or close enough to the first timestamp to be relevant to the received textual data. Some applications, such as chatbot interactions regarding technical errors, may have a relatively long relevance window of a few months or a few years, as technical updates may not be issued more frequently. On the other hand, interactions that may be labeled on the basis of individual news stories may be more relevant to newly received data on a shorter time period, such as weeks or days. Thus, the system may determine or receive a relevance window and determine a relevance timestamp according to the nature of the data and its potential obsolescence.

At step 408, process 400 (e.g., using one or more components described above) may retrieve a plurality of datasets. That is, the system may retrieve a plurality of datasets, wherein each of the plurality of datasets corresponds to a given receipt range. For example, the system may search in a database for datasets that may be relevant to labeling the received textual data. In some embodiments, the system can determine a receipt range corresponding to each dataset of the plurality of datasets. For instance, each dataset may have an associated range of times corresponding to a range of when data within each dataset may have been received. By retrieving datasets, the system may leverage past labeling decisions for other data that has been grouped by similarity. For example, datasets may be grouped by label, as shown in FIG. 1, and may include information related to the time of receipt of data within the dataset, such as an average timestamp of receipt. Thus, the system may handle incoming data through comparison with these pre-labeled datasets, rather than processing individual labeling tasks for the received data (e.g., without using human labeling or processing power-intensive artificial intelligence). By doing so, the system streamlines the labeling process by exploiting collective decision making.

At step 410, process 400 (e.g., using one or more components described above) may select a first dataset from the plurality of datasets. That is, the system may select a first dataset from the plurality of datasets based on the first dataset corresponding to the first receipt range. For example, the system may compare receipt ranges corresponding to each dataset with the first receipt range. Because the first receipt range provides an indication of data that may be considered relevant to a labeling decision for the first textual data, the system may select a dataset that is consistent with this first receipt range. For example, the system may not select datasets for whom the corresponding receipt ranges have a start date earlier than the start date corresponding to the first receipt range. In some embodiments, the system may not select datasets for whom the corresponding receipt ranges have an end date later than the end date corresponding to the first receipt range. By selecting a dataset on the basis of the receipt of the underlying data, the system may ensure that only information relevant to the received textual data may be incorporated into any labeling decisions. Thus, the system may ensure that labeling decisions are accurate characterizations of any dynamically received information.

In some embodiments, the system may select the first dataset from the plurality of datasets based on a given dataset's average receipt time. That is, the system may calculate an average receipt time for the first dataset and compare the average receipt time with the first receipt range. Based on determining that the average receipt time is within the first receipt range, the system may select the first dataset. For example, as shown in FIG. 1, datasets, indicated by dataset identifiers 120, may exhibit an average timestamp (e.g., as shown by dataset average timestamps 124). In some embodiments, the average timestamp may include an average of timestamps corresponding to individual data within the dataset (e.g., as identified by dataset identifiers 120). Data within each dataset may or may not be labeled with different labels. For example, as shown in FIG. 1, a dataset may have an associated label for all data within the given dataset. In some embodiments, each piece of data within the dataset may be labeled with its own label (e.g., if data is grouped within the dataset based on a measure similarity rather than labels themselves). Corresponding timestamps may correspond to times of receipt of the data within the given dataset. Thus, the system may characterize datasets by an average time of receipt, in order to evaluate the relevance of a given dataset to any subsequently received textual data. By evaluating the relevance of a given dataset, the system may improve the accuracy of labeling tasks as applied to the received textual data.

At step 412, process 400 (e.g., using one or more components described above) may retrieve second textual data from the first dataset. That is, the system may retrieve second textual data from the first dataset, wherein the second textual data is based on a second text string, wherein the second textual data has a second timestamp, and wherein the second timestamp is within the first receipt range. For example, the system may select second textual data from the selected dataset based on determining that its timestamp fits within the first receipt range that corresponds to the first textual data. This second textual data may include other chatbot interactions stored in a database, for example. By determining second textual data, the system may determine whether to label the first textual data based on similarity to the second textual data, for example. Thus, by selecting the second textual data, the system may leverage comparison in order to simplify labeling decisions, without the need for independent labeling by humans or computationally expensive artificial intelligence models.

At step 414, process 400 (e.g., using one or more components described above) may determine a first similarity metric. That is, the system may determine a first similarity metric between the first textual data and the first dataset. For example, the system may generate a quantitative measure between how similar data within the first dataset is when compared to the received textual data. The system may execute this comparison on the basis of sentiment, lexicon, character similarity, or any other characteristic of the textual data (e.g., length). By generating a similarity metric between the first textual data and the first dataset, the system may associate any dynamically received data with a similar group of textual data such that independent labeling of the data may not be required. Thus, by determining similarity metrics, the system may simplify the labeling process for dynamically received data and reduce reliance on individual labeling tasks by leveraging similarity between the received data and other relevant received data. Thus, the system may improve the efficiency and accuracy of labeling tasks through the determination of similarity metrics.

In some embodiments, the system may determine the first similarity metric using vector representations of the relevant data. That is, the system may generate a first vector representation of the first text string. The system may generate a plurality of vector representations, wherein each vector representation of the plurality of vector representations corresponds to each text string in the first dataset. The system may calculate a plurality of similarity metrics, wherein each similarity metric in the plurality of similarity metrics corresponds to a measure of similarity between the first vector representation and each vector representation in the plurality of vector representations. The system may calculate an average of the plurality of similarity metrics to generate the first similarity metric. For example, the system may extract or retrieve all data (or, in some embodiments, a sample of data) from the chosen dataset and evaluate this data on the basis of similarity with the received textual data. The system may accomplish this by generating a vector representation of both the received textual data, as well as the data within the chosen dataset. In some embodiments, the vector representation of the textual data may include semantic, syntactic, and/or lexical information regarding the given data (e.g., generation of vectors through a word2vec algorithm), and may be in two or more dimensions. Vector representations may be easier to analyze and compare as compared to raw text data, as vector representations may encode meaning or effective distance between different words. Thus, by utilizing vector representations, the system may improve the accuracy of similarity metric calculations. The system may generate similarity metrics for the received textual data with respect to each piece of data within the dataset (e.g., as shown in FIG. 2, demonstrating similarity metrics 210), and generate an overall similarity metric based on this analysis, such as average similarity metric 212 as shown in FIG. 2. In some embodiments, the system may only choose a representative sample of the dataset for similarity metric determination, in order to improve the efficiency of calculations. Thus, the system may characterize the entirety of the dataset on the basis of similarity with the received textual data, thereby aiding collective, comparative labeling decisions for the received first textual data.

In some embodiments, the system may calculate the plurality of similarity metrics through calculation of text distances. That is, the system may generate a plurality of text distances between the first vector representation and each vector representation in the plurality of vector representations. The system may determine the plurality of similarity metrics based on the plurality of text distances. For example, through an algorithm such as word2vec, the system may encode information regarding meaning, lexical complexity, grammar/syntax, and other information (e.g., semantics) through the conversion of text to vector form. For example, the system may generate vectors such that the resulting vector representations capture semantic and syntactic qualities of words, in order to indicate a level of semantic similarity between the represented words. Thus, the system may compare text distances by comparing the vector representations (e.g., by finding a Euclidean distance between the vectors), or by generating a cosine similarity between words or phrases. The similarity metric may, for example, be based on a normalized version of the inverse of these distances. By doing so, the system enables accurate calculations of distance between textual data, which assists the system in determining similarity metrics in an internally consistent way across all textual datasets.

In some embodiments, the system may calculate the plurality of similarity metrics by inputting the vector representations into a natural language processing model. That is, the system may input the first vector representation and the plurality of vector representations into a natural language processing model. Based on inputting the first vector representation and the plurality of vector representations into the natural language processing model, the system may generate the plurality of similarity metrics. For example, the system may process the textual data associated with chatbot interactions from the respective datasets and determine the plurality of similarity metrics based on results of the natural language processing model, which may consider syntactical, lexical, and semantic information encoded within the textual data. By doing so, the system may leverage natural language processing techniques to improve the accuracy of textual data comparisons and the resulting similarity metrics.

At step 416, process 400 (e.g., using one or more components described above) may compare the first similarity metric to a threshold similarity metric. For example, the system may determine that the first similarity metric is above or below the threshold similarity metric. If the system determines that the first similarity metric is above the threshold similarity metric, the system may determine that the dataset is similar to the first textual data, and may base further labeling decisions upon this determination. On the other hand, if the system determines that the first similarity metric is below the threshold similarity metric, the system may, in some embodiments, select another dataset that may be more relevant to the labeled data. In some embodiments, the threshold similarity metric may depend on the particular chatbot interaction, application, or nature of the textual data, or the intended labeling task. For example, a system for labeling chatbot interactions based on language spoken may rely on a relatively low threshold similarity metric, as languages tend to be very different and easily classifiable. A system for labeling chatbot interactions based on particular emotions may require a higher threshold similarity metric, as emotions may be easily confused or mischaracterized, thereby requiring a low tolerance for error. Thus, by comparing the first similarity metric with a threshold metric, the system may evaluate accurately whether a given dataset is relevant to the received textual data, thereby improving accuracy in any subsequent labeling decisions.

In some embodiments, the system may further generate a warning for display on a user interface based on the comparison. That is, the system may determine that the first similarity metric is below the threshold similarity metric. Based on determining that the first similarity metric is below the threshold similarity metric, the system may generate a warning for display on a user interface. For example, the system may determine, based on the calculated similarity metric, that the received textual data is not substantially similar to the selected dataset. Based on this determination, the system may generate a warning on a user interface in order to alert any users of the system that an adequate comparator was not determined for the given dynamically received textual data. By generating such a warning, the system enables tracking and filtering of any data that may require additional aid in determining a label due to a lack of similarity with any previously-received data. Thus, the system may alert users of the system of such circumstances and enable the users to label the data accordingly (e.g., manually, or using an artificial intelligence algorithm), thereby ensuring that all received data may be treated and categorized efficiently and accurately.

In some embodiments, the system may select a second dataset from the plurality of datasets based on the comparison. That is, the system may determine that the first similarity metric is below the threshold similarity metric. Based on determining that the first similarity metric is below the threshold similarity metric, the system may select a second dataset from the plurality of datasets based on the second dataset corresponding to the first receipt range. For example, the system may select another dataset, because the first selected dataset is not similar to the textual data (e.g., that the corresponding similarity metric did not meet the threshold value). In some embodiments, this second dataset may be assigned a second similarity metric and compared against the threshold similarity metric value, thereby enabling the system to search for further datasets that may be similar to the received textual data. Thus, the system may find a suitable dataset with which to execute labeling decisions, even if not all datasets are suitably similar. This process enables the system to handle more difficult labeling tasks for rarer received textual data, thereby contributing to the system's robustness and accuracy.

At step 418, process 400 (e.g., using one or more components described above) may determine to assign a label for the second textual data to the first textual data. That is, based on comparing the first similarity metric to the threshold similarity metric, the system may determine to assign a label for the second textual data to the first textual data. For example, in response to determining that the first textual data is similar to the first dataset (through the first similarity metric, for example), the system may determine to apply any label applied to the second textual data (a part of the first dataset) to the first textual data. By doing so, the system may apply a label to the dynamically received textual data without manually generating a label from scratch for the textual data. Rather, the system may apply a label from a piece of data that is associated with a dataset similar to the received data. Thus, the system may determine a label based on collective properties of the textual dataset and the corresponding similar dataset, thereby simplifying labeling tasks and enabling faster, more efficient labeling of dynamically received data. By basing this decision on a similarity metric, the system ensures that the accuracy of the labeling decision may be protected.

In some embodiments, the system may determine a representativeness metric for the second textual data and determine a label based on this data. That is, the system may retrieve, from the first dataset, third textual data, wherein the third textual data is based on a third text string from chatbot conversations. The system may determine that a third timestamp at which the third textual data was received is within the first receipt range. The system may calculate a first representativeness metric for the second textual data based on the first textual data, the second textual data, and the third textual data. Based on the first similarity metric and the first representativeness metric, the system may determine a label for the first textual data based on the second textual data. For example, having determined that the first dataset is substantially similar to the textual dataset, the system can determine which of the data within the first dataset with which to base a labeling decision for the first textual data. That is, the system may determine a piece of data within the first dataset that is representative of the rest of the dataset. The system may generate a representativeness metric in order to determine the degree to which a given piece of data within the dataset is representative of the other data within the dataset. In some embodiments, a representativeness metric for a given piece of data may be calculated based on generating similarity metrics of that given piece of data with respect to all other data within the dataset. In some embodiments, the representativeness metric may be generated based on a sample of such similarity metrics. By generating a representativeness metric, the system may determine which piece of data to use to label the received textual data.

Thus, because not all data within a dataset may be labeled with the same label, the system may use the label corresponding to a representative piece of data within the dataset to label the received textual data. The system may calculate the representativeness metric for the second textual data based on other data in the dataset (e.g., the first, second, and third textual data), and determine that the second textual data is sufficiently representative of the group (e.g., the representativeness metric is higher than a threshold representativeness metric). By doing so, the system may improve the accuracy of label generation, such that any outliers in a given dataset do not influence any labeling decisions directly.

In some embodiments, the system may determine a representativeness metric for the third textual data, and determine a label for the first textual data based on different data (e.g., the second textual data). That is, the system may retrieve, from the first dataset, third textual data, wherein the third textual data is based on a third text string from chatbot conversations. The system may determine that a third timestamp at which the third textual data was received is within the first receipt range. The system may calculate a first representativeness metric for the third textual data based on the first textual data, the second textual data, and the third textual data. Based on the first similarity metric and the first representativeness metric, the system may determine a label for the first textual data based on the second textual data. For example, the system may determine a representativeness metric for other textual data, distinct from the second textual data, within the dataset. In some embodiments, the system may determine that this representativeness metric is too low (e.g., lower than a threshold representativeness metric), and determine the label based on the second textual dataset instead, as the third textual data has been determined not to be representative of the rest of the dataset. Thus, in situations where data is determined not to be representative of the rest of the dataset, the system may determine a label based on alternative data, thereby improving the robustness of the labeling decision and reducing the chance of further inconsistencies or inaccuracies.

In some embodiments, the system may compare the first and second representativeness metrics to determine which label to apply to the first textual data. That is, the system may retrieve, from the first dataset, third textual data, wherein the third textual data is based on a third text string from chatbot conversations. The system may determine that a third timestamp at which the third textual data was received is within the first receipt range. Based on the first textual data, the second textual data, and the third textual data, the system may calculate a first representativeness metric for the second textual data and a second representativeness metric for the third textual data. The system may compare the first representativeness metric and the second representativeness metric. Based on comparing the first representativeness metric and the second representativeness metric, the system may determine a label for the first textual data based on the third textual data. For example, the system may determine the representativeness metrics for two pieces of data in the dataset and determine which of these data is more representative of the given dataset. The system may label the first textual data accordingly. For example, the system may determine that the second representativeness metric is higher than the first representativeness metric. Accordingly, the system may determine that the third textual data is more representative of the dataset than the second textual data. In response to this determination, the system can label the first textual data based on the third textual data rather than the second textual data. In some embodiments, the system may calculate representativeness metrics for many or all pieces of data within a dataset and determine a piece of data that has the highest representativeness metric; in response to this determination, the system may label the first textual data according to that piece of data. Thus, the system may simplify labeling decisions by enabling labeling based on similarity with a dataset and, further, based on data that is most representative of this group of data. By doing so, the system may label incoming, dynamically received data immediately based on groups of data that have already been labeled, without manually or individually labeling the data upon arrival. Thus, the system improves the efficiency and accuracy of labeling incoming data.

In some embodiments, the system may generate a feature input for the machine learning model based on the label and first textual data and generate an output for the machine learning model. That is, the system may generate a first feature input for training a machine learning model based on the first textual data and the label, wherein the machine learning model uses a sentiment analysis algorithm. The system may generate a first output for the machine learning model based on the first textual data and the label. For example, the system may train the model using the label and first textual data, where the label may refer to a sentiment associated with the textual data. The system may use the label applied to the first textual data within a machine learning model (e.g., a label for chatbot data related to a query type) in order to generate or train predictions or outputs (e.g., whether the query was answered in a way that the chatbot user was satisfied). By doing so, the system may test any label that was applied to the training data within the application, enabling further diagnostics, evaluations, or analyses of the output, such that labeling decisions may be further improved.

In some embodiments, the system may determine a prediction based on the machine learning model and determine whether the model was accurately trained based on the first textual data. That is, based on training the machine learning model, the system may generate a first prediction for a first sentiment that characterizes test textual data. Based on comparing the first textual sentiment to a training sentiment, the system may determine a performance metric for the machine learning model, wherein the training sentiment indicates a ground-truth sentiment. For example, after having trained the machine learning model using the label applied previously, the system may determine model accuracy or error based on comparing a prediction that is output from the model (e.g., test textual data) with the known result or sentiment (e.g., a ground-truth sentiment). In this use case, the machine learning model may utilize a sentiment analysis algorithm to predict a characterization of test chatbot data by sentiment. In response, the system may generate a prediction (e.g., that the chatbot user was frustrated), and compare this with known data, such as a filled out user feedback form, in order to determine whether the model's prediction for a sentiment was accurate and, accordingly, a performance metric for the model. The performance metric may include information regarding model error for many datasets, such as a chi-squared test or another statistical model for determining errors of predictions. By doing so, the system may be able to evaluate the labels that have been applied to training data and, subsequently, may utilize this information to evaluate and further improve decision making for labeling received data. Thus, the system may improve the accuracy of labeling decisions over time.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, from a first device in a computer network, first textual data, wherein the first textual data is based on a first text string from chatbot conversations; determining a first timestamp at which the first textual data was received based on chatbot transcript metadata; determining a first receipt range for the first textual data based on the first timestamp; retrieving a plurality of datasets, wherein each of the plurality of datasets corresponds to a given receipt range and each of the plurality of datasets comprises chatbot data labeled with a pre-existing label; selecting a first dataset from the plurality of datasets based on the first dataset corresponding to the first receipt range; retrieving a second textual data from the first dataset, wherein the second textual data is based on a second text string, wherein the second textual data has a second timestamp, and wherein the second timestamp is within the first receipt range; determining a first similarity metric between the first textual data and the first dataset, wherein the first similarity metric indicates a measure of text similarity between the first textual data and data within the first dataset; comparing the first similarity metric to a threshold similarity metric; based on comparing the first similarity metric to the threshold similarity metric, determining to assign a label for the second textual data to the first textual data; retrieving, from the first dataset, third textual data, wherein the third textual data is based on a third text string from the chatbot conversations; determining that a third timestamp at which the third textual data was received is within the first receipt range; calculating a first representativeness metric for the second textual data based on the first textual data, the second textual data, and the third textual data, wherein the first representativeness metric indicates an extent to which the second textual data represents a set comprising the first textual data, the second textual data, and the third textual data; and based on the first similarity metric and the first representativeness metric, determining a label for the first textual data based on the second textual data.

2. A method comprising: receiving, from a first device in a computer network, first textual data, wherein the first textual data is based on a first text string; determining a first timestamp at which the first textual data was received; determining a first receipt range for the first textual data based on the first timestamp; retrieving a plurality of datasets, wherein each of the plurality of datasets corresponds to a given receipt range; selecting a first dataset from the plurality of datasets based on the first dataset corresponding to the first receipt range; retrieving a second textual data from the first dataset, wherein the second textual data is based on a second text string, wherein the second textual data has a second timestamp, and wherein the second timestamp is within the first receipt range; determining a first similarity metric between the first textual data and the first dataset; comparing the first similarity metric to a threshold similarity metric; and based on comparing the first similarity metric to the threshold similarity metric, determining to assign a label for the second textual data to the first textual data.

3. The method of any one of the preceding embodiments, further comprising: retrieving, from the first dataset, third textual data, wherein the third textual data is based on a third text string from chatbot conversations; determining that a third timestamp at which the third textual data was received is within the first receipt range; calculating a first representativeness metric for the second textual data based on the first textual data, the second textual data, and the third textual data; and based on the first similarity metric and the first representativeness metric, determining a label for the first textual data based on the second textual data.

4. The method of any one of the preceding embodiments, further comprising: retrieving, from the first dataset, third textual data, wherein the third textual data is based on a third text string from chatbot conversations; determining that a third timestamp at which the third textual data was received is within the first receipt range; calculating a first representativeness metric for the third textual data based on the first textual data, the second textual data, and the third textual data; and based on the first similarity metric and the first representativeness metric, determining a label for the first textual data based on the second textual data.

5. The method of any one of the preceding embodiments, further comprising: retrieving, from the first dataset, third textual data, wherein the third textual data is based on a third text string from chatbot conversations; determining that a third timestamp at which the third textual data was received is within the first receipt range; calculating, based on the first textual data, the second textual data, and the third textual data, a first representativeness metric for the second textual data and a second representativeness metric for the third textual data; comparing the first representativeness metric and the second representativeness metric; and based on comparing the first representativeness metric and the second representativeness metric, determining a label for the first textual data based on the third textual data.

6. The method of any one of the preceding embodiments, wherein determining the first timestamp at which the first textual data was received comprises: retrieving a system clock setting at a time of receipt for the first textual data, wherein the system clock setting comprises a standardized setting for recording times across the computer network; and generating the first timestamp based on the system clock setting.

7. The method of any one of the preceding embodiments, wherein determining the first receipt range for the first textual data based on the first timestamp comprises: based on the textual data, generating a relevance window, wherein the relevance window comprises a length of time, and wherein the relevance window indicates a period of time before which information may not be considered for labeling decisions; and based on the relevance window, determining a relevance timestamp after which the information will be considered.

8. The method of any one of the preceding embodiments, wherein selecting the first dataset from the plurality of datasets based on the first dataset corresponding to the first receipt range comprises: calculating an average receipt time for the first dataset; comparing the average receipt time with the first receipt range; and based on determining that the average receipt time is within the first receipt range, selecting the first dataset.

9. The method of any one of the preceding embodiments, wherein determining the first similarity metric between the first textual data and the first dataset comprises: generating a first vector representation of the first text string; generating a plurality of vector representations, wherein each vector representation of the plurality of vector representations corresponds to each text string in the first dataset; calculating a plurality of similarity metrics, wherein each similarity metric in the plurality of similarity metrics corresponds to a measure of similarity between the first vector representation and each vector representation in the plurality of vector representations; and calculating an average of the plurality of similarity metrics to generate the first similarity metric.

10. The method of any one of the preceding embodiments, wherein calculating the plurality of similarity metrics comprises: generating a plurality of text distances between the first vector representation and each vector representation in the plurality of vector representations; and determining the plurality of similarity metrics based on the plurality of text distances.

11. The method of any one of the preceding embodiments, wherein calculating the plurality of similarity metrics comprises: inputting the first vector representation and the plurality of vector representations into a natural language processing model; and based on inputting the first vector representation and the plurality of vector representations into the natural language processing model, generating the plurality of similarity metrics.

12. The method of any one of the preceding embodiments, further comprising: generating a first feature input for training a machine learning model based on the first textual data and the label, wherein the machine learning model uses a sentiment analysis algorithm; and generating a first output for the machine learning model based on the first textual data and the label.

13. The method of any one of the preceding embodiments, further comprising: based on training the machine learning model, generating a first prediction for a first sentiment that characterizes test textual data; and based on comparing the first sentiment to a training sentiment, determining a performance metric for the machine learning model, wherein the training sentiment indicates a ground-truth sentiment.

14. The method of any one of the preceding embodiments, further comprising: determining that the first similarity metric is below the threshold similarity metric; and based on determining that the first similarity metric is below the threshold similarity metric, generating a warning for display on a user interface.

15. The method of any one of the preceding embodiments, further comprising: determining that the first similarity metric is below the threshold similarity metric; and based on determining that the first similarity metric is below the threshold similarity metric, selecting a second dataset from the plurality of datasets based on the second dataset corresponding to the first receipt range.

16. A tangible, non-transitory, machine-readable medium storing instructions that, when executed by a data processing apparatus, cause the data processing apparatus to perform operations comprising those of any of embodiments 1-15.

17. A system comprising one or more processors; and memory storing instructions that, when executed by the processors, cause the processors to effectuate operations comprising those of any of embodiments 1-15.

18. A system comprising means for performing any of embodiments 1-15.

What is claimed is:

1. A system for dynamically generating textual data groups in real time such that the textual data groups preserve semantic and syntactic information for collective labeling, the system comprising:

one or more processors; and one or more non-transitory, computer-readable media comprising instructions that, when executed by the one or more processors, cause operations comprising:

storing within a label record database, at a first timestamp, first textual data representing a first text string from chatbot conversations received from a first device in a computer network;

querying the label record database to retrieve a plurality of datasets respectively corresponding to a plurality of receipt ranges for the first textual data based on the first timestamp and each of the plurality of datasets comprises chatbot data labeled with respective pre-existing labels;

inputting, the first textual data and a dataset corresponding to a receipt range for the first textual data based on the first timestamp from the plurality of datasets into a natural language processing model to determine a similarity metric indicating a measure of text similarity between the first textual data and data within the dataset;

assigning and storing, in the label record database, in response to determining that the similarity metric is greater than or equal to a threshold similarity metric, a first pre-existing label of second textual data from the dataset representing a second text string and having a second timestamp within the receipt range, to the first textual data to reduce labeling tasks;

inputting, (i) the first textual data, (ii) the second textual data, and (iii) third textual data from the dataset representing a third text string from the chatbot conversations and having a third timestamp at which the third textual data was received within the receipt range, into a the natural language processing model to calculate a representativeness metric for the third textual data based on the first textual data, the second textual data and the third textual data, wherein the representativeness metric indicates an extent to which the second textual data represents a set comprising the first textual data, the second textual data, and the third textual data;

preventing the first pre-existing label assigned to the first textual data from being updated, in the label record database, based on a second pre-existing label for the third textual data, responsive to (i) the similarity metric being greater than or equal to the threshold similarity metric and (ii) determining that the third textual data fails to be representative of at least the first textual data and the second textual data from the dataset based on the representativeness metric being less than a threshold representative metric; and based on the representativeness metric being less than the threshold representative metric, providing, to the first device, a user interface comprising a warning to enable tracking and filtering of the first textual data.

2. A method comprising:

storing, within a label record database, first textual data representing a first text string received from a first device in a computer network at a first timestamp;

querying the label record database to retrieve a plurality of datasets respectively corresponding to a plurality of receipt ranges for the first textual data based on the first timestamp and each of the plurality of datasets comprises chatbot data labeled with respective pre-existing labels;

inputting the first textual data and a dataset corresponding to a receipt range for the first textual data based on the first timestamp into a natural language processing model to determine a similarity metric indicating a similarity of the first textual data and the dataset;

assigning and storing, in the label record database, based on the similarity metric being greater than or equal to a threshold similarity metric, a first pre-existing label for the of second textual data from the dataset having a second timestamp within the receipt range as a label for the first textual data to reduce labeling tasks;

inputting (i) the first textual data, (ii) the second textual data, and (iii) third textual data from the dataset having a third timestamp within the receipt range, into the natural language processing model to calculate a first representativeness metric for the third textual data based on the first textual data, the second textual data, and the third textual data;

preventing the first pre-existing label assigned to the first textual data from being updated, in the label record database, based on a second pre-existing label for the third textual data, responsive to (i) the similarity metric being greater than or equal to the threshold similarity metric and (ii) the first representativeness metric being less than a threshold representative metric; and based on the first representativeness metric being less than the threshold representative metric, providing, to the first device, a user interface comprising a warning to enable tracking and filtering of the first textual data.

3. The method of claim 2, wherein
the first representativeness metric for the second textual data indicates an extent to which the second textual data represents a set comprising the first textual data, the second textual data, and the third textual data.

4. The method of claim 2, further comprises:
inputting, (i) the first textual data, (ii) the second textual data, and (iii) fourth textual data from the dataset having a fourth timestamp within the receipt range into the natural language processing model to calculate (i) a second representativeness metric for the second textual data based on the first textual data, the second textual data, and the fourth textual data, and (ii) a third representativeness metric for the fourth textual data; and updating and storing, in the label record database, based on comparing the second representativeness metric and the third representativeness metric, the label for the first textual data based on a third pre-existing label for the fourth textual data.

5. The method of claim 2, wherein storing the first textual data comprises:
retrieving a system clock setting at a time of receipt for the first textual data from the first device in the computer network, wherein the system clock setting comprises a standardized setting for recording times across a computer network; and
generating the first timestamp based on the system clock setting.

6. The method of claim 2, wherein inputting the first textual data and the dataset corresponding to the receipt range comprises:
based on the first textual data, generating a relevance window comprising a length of time and indicates a period of time before which information is not to be considered for labeling decisions; and
based on the relevance window, determining a relevance timestamp after which the information is considered to determine the receipt range.

7. The method of claim 2, wherein inputting the first textual data and the dataset into the natural language processing model comprises:
calculating an average receipt time for the dataset; and
comparing the average receipt time with the receipt range, wherein the dataset is selected based on that the average receipt time being within the receipt range.

8. The method of claim 2, wherein inputting the first textual data and the dataset into the natural language processing model to determine the similarity metric comprises:
generating a vector representation of the first textual data;
generating a plurality of vector representations respectively corresponding to a plurality of text strings in the dataset;
calculating a plurality of similarity metrics respectively corresponding to a measure of similarity between the vector representation and each vector representation in the plurality of vector representations; and
calculating an average of the plurality of similarity metrics, wherein the similarity metric represents the average.

9. The method of claim 8, wherein calculating the plurality of similarity metrics comprises:
generating a plurality of text distances between the vector representation and each vector representation in the plurality of vector representations; and
determining the plurality of similarity metrics based on the plurality of text distances.

10. The method of claim 8, wherein calculating the plurality of similarity metrics comprises:
inputting the vector representation and the plurality of vector representations into the natural language processing model; and
based on inputting the vector representation and the plurality of vector representations into the natural language processing model, generating the plurality of similarity metrics.

11. The method of claim 2, further comprising:
generating a feature input for training a machine learning model based on the first textual data and the label for the first textual data, wherein the machine learning model uses a sentiment analysis algorithm; and
generating an output for the machine learning model based on the first textual data and the label.

12. The method of claim 11, further comprising:
based on training the machine learning model, generating a prediction for a sentiment characterizing sample textual data; and
based on comparing the sentiment to a training sentiment, determining a performance metric for the machine learning model, wherein the training sentiment indicates a ground-truth sentiment.

13. The method of claim 2, wherein the similarity metric comprises a first similarity metric, the method further comprises:
inputting fourth textual data having a fourth timestamp within the receipt range and the dataset into the natural language processing model;
to determine a second similarity metric indicating a similarity of the fourth textual data and the dataset; and
based on the second similarity metric being less than the threshold similarity metric, providing, to the first device, a user interface comprising a warning to enable tracking and filtering of the first textual data.

14. The method of claim 2, wherein the similarity metric comprises a first similarity metric, the method further comprises:

inputting fourth textual data having a fourth timestamp within the receipt range and the dataset into the natural language processing model to determine a second similarity metric indicating a similarity of the fourth textual data and the dataset; and based on the second similarity metric being less than the threshold similarity metric, selecting a second dataset from the plurality of datasets based on the second dataset corresponding to the receipt range.

15. One or more non-transitory, computer-readable media comprising instructions that, when executed by one or more processors, causes operations comprising:

storing, within a label record database, first textual data representing a first text string received from a first device of a computer network at a first timestamp;

querying the label record database to retrieve a plurality of datasets, respectively corresponding to a plurality of receipt ranges for the first textual data based on the first timestamp and each of the plurality of datasets comprises chatbot data labeled with respective pre-existing labels;

inputting, the first textual data and a dataset corresponding to a receipt range for the first textual data based on the first timestamp from the plurality of datasets into an artificial intelligence model to determine a similarity metric indicating a similarity of the first textual data and the dataset;

assigning and storing, in the label record database, based on the similarity metric being greater than or equal to a threshold similarity metric, a first pre-existing label of second textual data having a second timestamp within the receipt range as a label for the first textual data;

inputting (i) the first textual data, (ii) the second textual data, and (iii) third textual data from the dataset having a third timestamp within the receipt range, into the artificial intelligence model to calculate a first representativeness metric for the third textual data;

preventing the first pre-existing label assigned to the first textual data from being updated, in the label record database, based on a second pre-existing label for the third textual data; and based on the first representativeness metric being less than a threshold representative metric, providing, to the first device, a user interface comprising a warning to enable tracking and filtering of the first textual data.

16. The one or more non-transitory, computer-readable media of claim 15, wherein the operations comprising:

inputting (i) the first textual data, (ii) the second textual data, and (iii) fourth textual data from the dataset having a fourth timestamp within the receipt range into the artificial intelligence model to calculate (i) a second representativeness metric for the second textual data, and (ii) a third representativeness metric for the fourth textual data; and updating and storing, in the label record database, based on comparing the second representativeness metric and the third representativeness metric, the label for the first textual data based on a third pre-existing label for the fourth textual data.

17. The one or more non-transitory, computer-readable media of claim 15, wherein inputting the first textual data and the dataset into the artificial intelligence model to determine the similarity metric between the first textual data and the dataset comprises:

generating a vector representation of the first textual data;

generating a plurality of vector representations, respectively corresponding to a plurality of text strings in the dataset;

calculating a plurality of similarity metrics, respectively corresponding to a measure of similarity between the vector representation and each vector representation in the plurality of vector representations; and calculating an average of the plurality of similarity metrics, wherein the similarity metric represents the average.

\* \* \* \* \*